United States Patent [19]
Gayton et al.

[11] Patent Number: 5,732,357
[45] Date of Patent: Mar. 24, 1998

[54] SELECTIVE SIMULCAST PAGING SYSTEM

[75] Inventors: Donald W. Gayton, North Vancouver; Riley S. Hoyt, Fort Langley, both of Canada

[73] Assignee: Glenayre Electronics, Inc., Charlotte, N.C.

[21] Appl. No.: 604,159

[22] Filed: Feb. 21, 1996

[51] Int. Cl.$^6$ .................. H04B 1/00; H04B 7/00
[52] U.S. Cl. .......... 455/503; 455/38.1; 455/458; 455/524; 340/825.44
[58] Field of Search .................. 455/38.1, 33.1, 455/33.4, 51.1, 51.2, 50.1, 54.1, 56.1, 12.1, 63, 426, 458, 502, 503, 517, 524; 340/825.44, 825.47

[56] References Cited

U.S. PATENT DOCUMENTS

| | | |
|---|---|---|
| 4,506,384 | 3/1985 | Lucas .................................. 455/51 |
| 4,910,511 | 3/1990 | Nagata et al. . |
| 5,077,830 | 12/1991 | Mallia . |
| 5,128,934 | 7/1992 | Jasinski . |
| 5,162,790 | 11/1992 | Jasinski . |
| 5,257,404 | 10/1993 | Goreham et al. . |
| 5,261,118 | 11/1993 | Vanderspool, II et al. . |
| 5,335,357 | 8/1994 | Fennell et al. . |
| 5,396,643 | 3/1995 | Frenzer et al. . |
| 5,475,863 | 12/1995 | Simpson et al. ................ 455/33.1 |

*Primary Examiner*—Andrew Faile
*Assistant Examiner*—Christopher Onuaku
*Attorney, Agent, or Firm*—Christensen O'Connor Johnson & Kindness PLLC

[57] ABSTRACT

A method of transmitting paging messages over a paging system configurable to provide coverage over a primary geographic area or region and at least two subregions defined within the primary geographic region. The paging system consists of a plurality of paging transmitters that broadcast paging messages to the primary geographic region. Some of the plurality of paging transmitters are also assigned to broadcast to a particular subregion within the primary geographic area. During primary operation, for part of a predetermined period of time, all of the paging transmitters within the paging system simulcast paging messages to subscribers entitled to coverage over the whole primary geographic region. For a remaining period of broadcast time, each of the paging transmitters assigned to broadcast to a respective subregion broadcast paging messages intended for subscribers entitled only to paging coverage within that particular subregion. Paging transmitters which do not cover any of the subregions are silent during this subregional paging message broadcast phase.

16 Claims, 6 Drawing Sheets

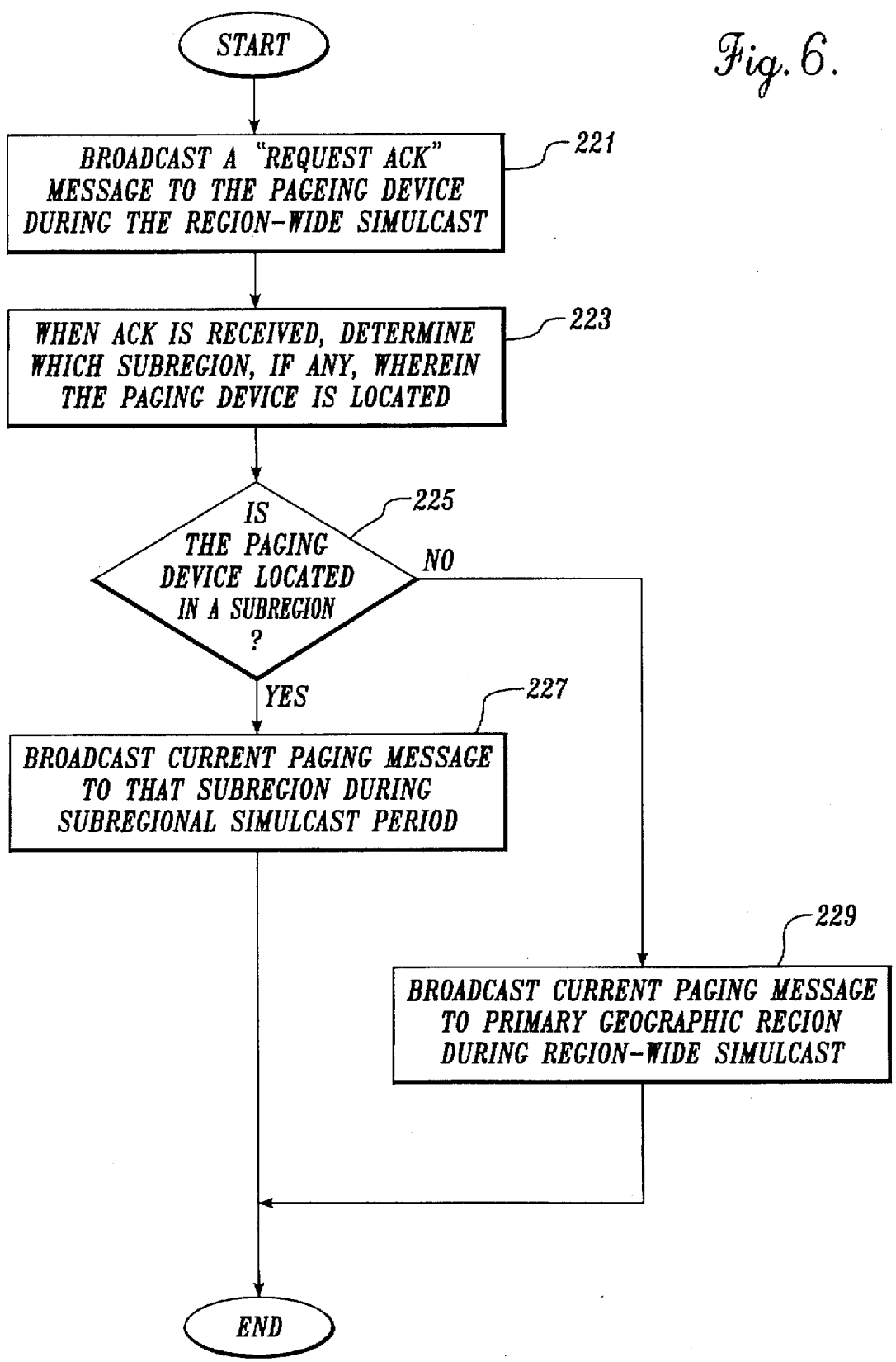

SELECTIVE SIMULCAST PAGING SYSTEM

FIELD OF THE INVENTION

The present invention is directed towards paging systems, and more particularly, to a paging system that broadcasts paging messages to a wide geographic region and to designated distinct subregions using selected paging transmitters within the paging system.

BACKGROUND OF THE INVENTION

Paging systems typically include a paging terminal that interfaces with a public switched telephone network (PSTN) and a plurality of paging transmitters that provide signal coverage over a wide geographic region. Examples of such paging systems are described in U.S. Pat. Nos. 5,365,569, 5,369,682, and 5,416,808, all to Witsaman et al. and commonly assigned to the assignee of the present invention and expressly incorporated by reference herein. These paging systems and others of the prior art are generally configured to allow the simulcasting of a signal through all of the paging transmitters of the paging system. By having many geographically spaced-apart paging transmitters, a wide geographic region can be reached by the signals of the paging system. The geographic region can be in some cases citywide, statewide, or even nationwide.

As a paging service provider adds more subscribers, the paging service provider's paging system often operates at or near full capacity during peak operating times. Paging messages may become backlogged and wait for increasing amounts of time to be transmitted. Indeed, the problem is exacerbated as the geographic range of coverage is increased simply because it is likely that the number of subscribers served within that geographic area is larger. Thus, for a statewide paging system for a large state such as California, the number of subscribers to a particular paging system can reach into the millions. With such a large number of subscribers, a statewide paging system can be easily overloaded.

Another difficulty arises when the paging service provider wishes to provide varying levels of service based upon geographic coverage. For example, certain subscribers to a paging service may need paging service only within a particular metropolitan area. Other subscribers may need paging service within a larger region covering two or three geographically proximate cities. The balance of the paging service subscribers may wish to have paging service within the whole geographic region covered by the paging system. A paging service provider can address the needs of these different subscribers by transmitting their respective paging messages only within the predetermined geographic area they each select. Thus, a California paging service provider may provide paging coverage for the entire state for some customers and coverage for only northern California or southern California for other customers. The paging service provider may further offer its subscribers a fee schedule commensurate with the size of geographic coverage selected. Thus, a California paging service provider may have one monthly service rate that is higher for statewide coverage and a second monthly service rate for limited coverage in only northern or southern California.

However, a problem with interference arises when a paging service provider attempts to broadcast each customer's paging messages only to the predetermined geographic area(s) each customer selects. Since the paging messages being broadcast to a customer in one area are different than the paging messages being broadcast to another customer in another area, if either customer is located where the broadcast coverage for one area overlaps the broadcast coverage of another area, the customer will receive conflicting paging signals. The overlapping paging signals being transmitted in one broadcast area will interfere with the paging signals being transmitted in another other area. In that event, successful delivery of the paging messages, within that overlapping area, will be disrupted.

The prior art solution to these problems has been to designate subregions within the coverage area of a paging system with each subregional broadcast occurring at separate intervals. Customers could subscribe for paging service within particular subregions or alternately for system-wide paging service. The paging service provider would divide up a predetermined block of broadcast time into a period of time for system-wide broadcasting and a period of time for each subregional broadcasting. The paging service provider would broadcast the paging messages for customers who subscribed to system-wide coverage over all the paging transmitters of the paging system during the period of time set aside for system-wide transmissions.

The remaining broadcast time designated for subregional broadcasting would then be divided amongst the subregions, each subregion taking its turn broadcasting paging messages within its subregion. While one subregion is broadcasting, all the paging transmitters outside the subregion remain silent. For example, a paging system that includes five designated subregions may first broadcast system-wide, using all of the paging transmitters, fifty percent of the time. The remaining fifty percent of the broadcast time would be split amongst the five subregions with each of the subregions broadcasting ten percent of the time.

Thus, after a system-wide broadcast period, the paging service would broadcast, for another period of time, paging messages for customers who subscribed to coverage in a particular subregion. This subregional broadcast would use selected paging transmitters of the paging system that covered the particular subregion. All the paging transmitters outside the presently-broadcasting subregion would remain silent.

Following the first subregional paging transmission, the paging service would broadcast, for another period of time, paging messages for customers who subscribed to coverage in a different particular subregion. Again, during that period of time, all paging transmitters outside the subregion would remain silent. This process of broadcasting to each subregion individually would continue for each defined subregion, whereupon the paging service provider would repeat the process, beginning again with system-wide broadcasting of system-wide messages.

While the prior art method allows paging service providers to provide subregional paging plans, it does so inefficiently. During subregional transmission periods, paging transmitters outside the currently-broadcasting subregion are switched off. Paging transmitters in each subregion remain silent until it becomes their turn to broadcast. Thus, during subregional broadcast time, large numbers of paging transmitters are turned off, leaving large amounts of broadcast capacity unused. In addition, the prior art has not successfully addressed the problems associated with large numbers of subscribers overloading the paging system, as identified above. Instead, at peak operating times, paging messages for system-wide or subregional broadcast must wait as each subregional broadcast is carried out.

The present invention addresses these and other problems in prior art paging systems.

SUMMARY OF THE INVENTION

It is an object of the invention to overcome inefficiencies found in the prior art by providing an improved method of transmitting paging messages over a paging system.

It is a further object of the invention to provide an improved method of transmitting paging messages over a paging system by using subregional broadcast time more efficiently.

A further object of the invention is to provide a method of transmitting paging messages over a paging system whereby broadcasts to designated subregions occur in more than one subregion during a substantially same period of time.

It is still a further object of this invention to make more efficient use of broadcast time by allowing one or more paging messages intended for broadcast over the entire paging system during system-wide broadcast time to be broadcast to a designated subregion during subregional broadcast time.

These objects and other objects of the invention are achieved by a method for operating a paging system configurable to provide paging coverage over a wide primary geographic region and smaller subregions defined within the primary geographic region. The paging system includes a plurality of paging transmitters that broadcast paging messages to subscribers of the paging system. As a whole, the plurality of paging transmitters provide paging coverage to the primary geographic region. Since the aforementioned subregions are defined within the primary geographic region, selected paging transmitters of the plurality of paging transmitters are also used to provide paging coverage to the subregions. The subregions are sufficiently geographically spaced-apart such that broadcast coverage in one subregion does not overlap the broadcast coverage in another subregion.

In one mode of operation, all of the paging transmitters within the paging system broadcast paging messages to subscribers entitled to coverage over the whole primary geographic region. In a second mode of operation, paging transmitters that broadcast within each defined subregion broadcast paging messages to subscribers entitled to coverage within the respective subregion. The broadcast in each subregion occurs substantially simultaneously relative to the broadcast in other subregions within the paging system. Only the paging transmitters which cover areas outside of the defined subregions are silent during this second mode of operation.

Another embodiment of the invention is a method for operating a two-way paging system similarly configurable to provide coverage over a primary geographic region and smaller subregions within the primary geographic region. The two-way paging system includes a plurality of paging transmitters, a plurality of paging devices, and a plurality of receivers. The paging transmitters broadcast paging messages to subscribers of the paging system. The paging devices are configured to receive and transmit messages. The plurality of receivers receive transmissions from the paging devices. As with the first embodiment, selected paging transmitters are additionally assigned to broadcast to a respective particular subregion within the primary geographic region.

This embodiment of the invention similarly uses two modes of operation. In the first mode of operation, all of the paging transmitters within the paging system broadcast paging messages to subscribers entitled to coverage over the whole primary geographic region. In the second mode of operation, paging transmitters that broadcast to subregions broadcast paging messages to subscribers entitled to coverage within the respective subregion. Again, the broadcast in each subregion occurs substantially simultaneously relative to the broadcast in other subregions. Paging transmitters which cover areas outside of the defined subregions are silent during this second mode of operation.

The method of the present invention may further include steps which permit one or more paging messages, intended for broadcast to subscribers entitled to full coverage of the paging system during the first mode of operation (region-wide broadcast), to be broadcast during the second mode of operation (subregional broadcast). The paging service first determines whether a message intended for region-wide broadcast is directed to a paging device that was last known to be located within a defined subregion. If so, the paging service then broadcasts the message to that subregion during the subregional broadcast period. If the paging service does not receive a signal from the paging device acknowledging receipt of the message, the paging service rebroadcasts the paging message during the region-wide broadcast. When an acknowledgment signal is received from the paging device, the paging service may determine and record the location of the device for future reference.

Alternatively, the method of the present invention may include another set of steps which permits one or more region-wide paging messages intended for broadcast during the first mode of operation (region-wide broadcast) to be broadcast during the second mode of operation (subregional broadcast). In performing these steps, the paging service first requests the paging device of the intended paging recipient to transmit an acknowledgment signal. When the signal is received, the paging service determines whether the paging device is located within the coverage area of a defined subregion. If so, the paging service broadcasts the message to that subregion during the subregional broadcast period. If not, the paging service broadcasts the message during the region-wide broadcast.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 6 is a flow diagram illustrating another embodiment of the method of the present invention suited for use with two-way paging systems.

DETAILED DESCRIPTION OF THE PREFERRED EMBODIMENTS

Figure 1:
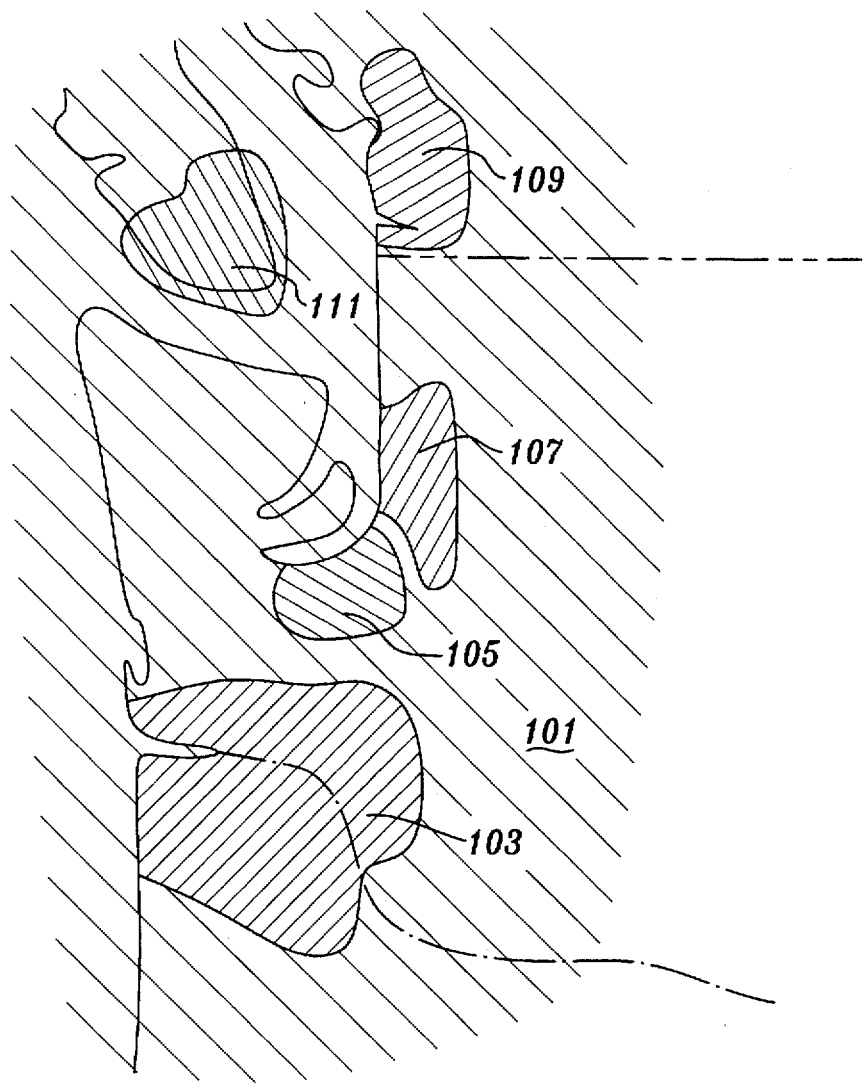
FIG. 1 illustrates a geographic region having a paging system that provides primary coverage to the geographic region as a whole and secondary coverage to five subregions.

FIG. 1 shows a primary geographic region indicated generally by reference numeral 101. For illustrative purposes only, in this case the primary geographic region 101 represents the Pacific Northwest region encompassing metropolitan areas such as Portland, Oreg., Seattle, Wash., and Vancouver, British Columbia. Within this primary geographic region 101 are shown five subregions. These subregions are referred to as the Portland subregion 103, the Olympia subregion 105, the Seattle subregion 107, the Vancouver subregion 109, and the Victoria subregion 111.

In accordance with the present invention, a new concurrent subregional broadcast method is disclosed. In providing a paging service to the primary geographic region 101, a paging service provider operating within the primary geographic region 101 has a paging system, shown in schematic form in FIG. 2, that includes a paging terminal 113 and a plurality of paging transmitters 115. The paging terminal 113 interfaces with a public switched telephone network (PSTN) 117. Persons who wish to send a paging message to a paging service subscriber supply the paging message to the paging terminal 113 via the telephone network 117. In a broad sense, the paging terminal 113 then formulates the paging message data and forwards it to the paging transmitters 115 for broadcast. It should be noted that the lines in FIG. 2 connecting the paging transmitters 115 to the paging terminal 113 do not necessarily indicate a physical connection. The paging terminal 113 may communicate with the paging transmitters 115 through any type of transmission means.

Figure 2:
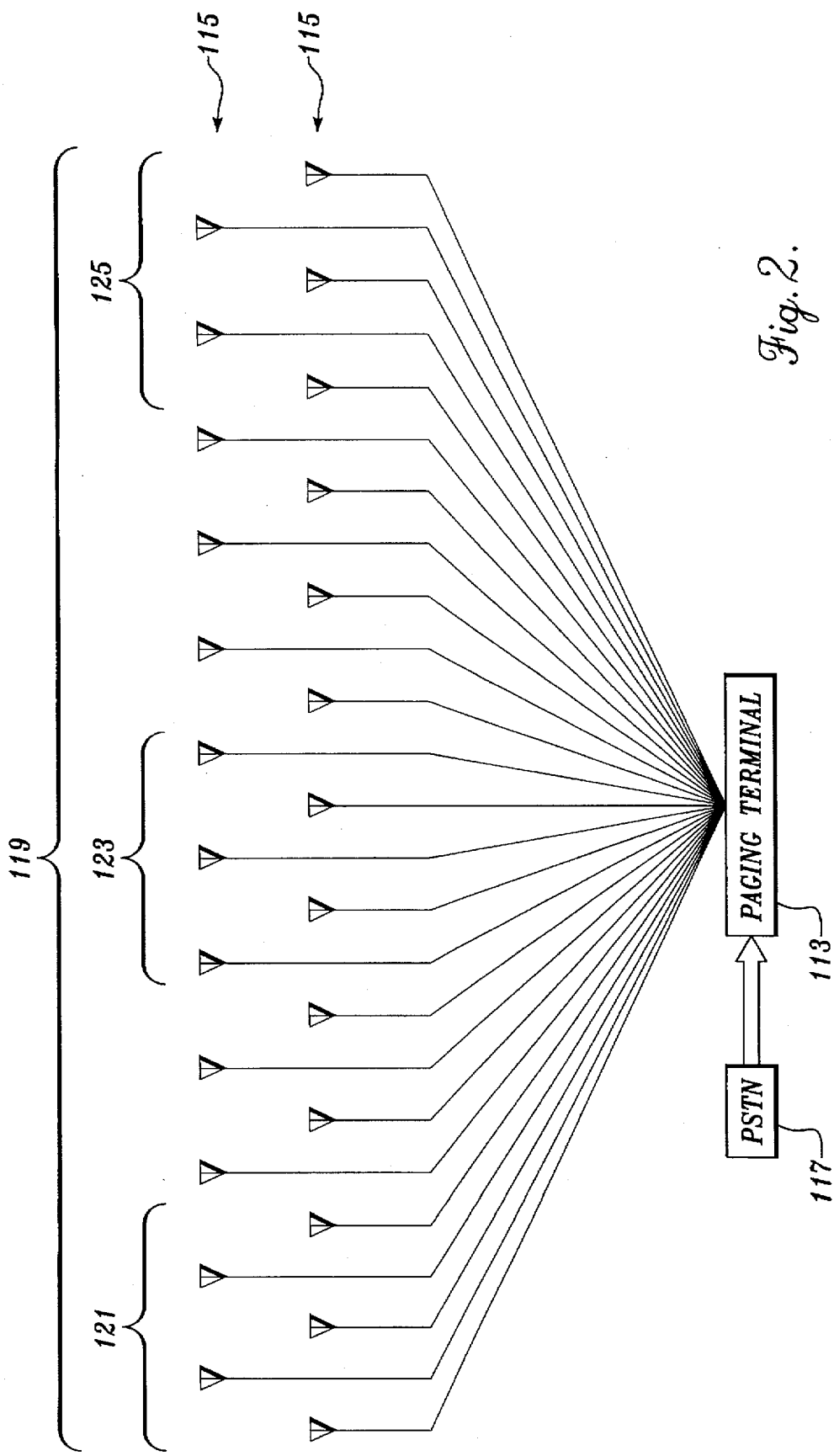
FIG. 2 is a schematic illustration of a paging system configured in accordance with the present invention.

In FIG. 2, the aggregate of the paging transmitters is indicated by reference numeral 119. Viewing FIGS. 1 and 2 together, the aggregate 119 of the paging transmitters 115 provide broadcast coverage to the entire primary geographic region 101. However, to provide coverage limited to a subregion (such as subregion 103, 105, 107, 109, or 111, defined within the primary geographic region 101) only a subset of the paging transmitters 115 is needed. For instance, paging coverage for only the Portland subregion 103 requires only a subset 121 of the paging transmitters 115. Similarly, only a subset 123 and a subset 125 of the paging transmitters 115 is needed to provide coverage for the Seattle subregion 107 and the Vancouver subregion 109, respectively. In other words, if a paging message is to be broadcast throughout the entire primary geographic region 101, all 119 of the paging transmitters 115 must broadcast the paging message. However, if a paging message is intended to be broadcast only in the Portland subregion 103, then only subset 121 of the plurality of paging transmitters will broadcast the message.

It should be noted that the subregions are defined such that the broadcast coverage by any one subset of the plurality of paging transmitters does not overlap the broadcast coverage of another subset. Thus, signals broadcast by subset 121 to the Portland subregion 103 do not overlap or interfere with broadcasts in areas of the Seattle subregion 107 covered by subset 123.

A paging system configured in the foregoing manner clearly enables a paging service provider operating within the primary geographic region 101 to sell to its subscribers a paging service that covers the whole primary geographic region 101. Subscribers entitled to region-wide coverage receive their paging messages while they are located anywhere within the broadcast coverage of the aggregate 119 of the paging transmitters 115. Furthermore, the paging service provider may sell to its subscribers a paging service that operates only within one or more or all of the subregions. Subscribers entitled to paging coverage within a particular subregion receive their paging messages only while they are located within the coverage area of the subset of paging transmitters covering the subregion. For example, paging messages intended for a subscriber entitled to paging service in the Seattle subregion 107 and the Olympia subregion 105 will be received by the subscriber only if the subscriber is located within the coverage areas of the Seattle 107 and Olympia 105 subregions.

Providing paging service for selected subregions in addition to the primary geographic region permits a paging service provider to offer different levels of paging service at different prices. A paging service provider may use a pricing schedule commensurate with the geographic size of paging coverage to which the paging subscriber is entitled. Thus, subscribers of the paging service entitled to coverage within the entire primary geographic region may pay at a highest subscriber rate. Subscribers that select only subregional paging coverage may pay at a reduced subscriber rate.

As mentioned above, persons wishing to page subscribers leave paging messages with the paging service via the telephone network 117. The paging terminal 113 formulates the paging messages into one or more paging data blocks and routes them to the paging transmitters for broadcast. Each paging message within a paging data block has at least two parts of information: (1) the identification code for the particular subscriber (referred to in the art as the "CAP code") to whom the paging message is intended, and (2) the actual message that is to be broadcast.

Figure 3:
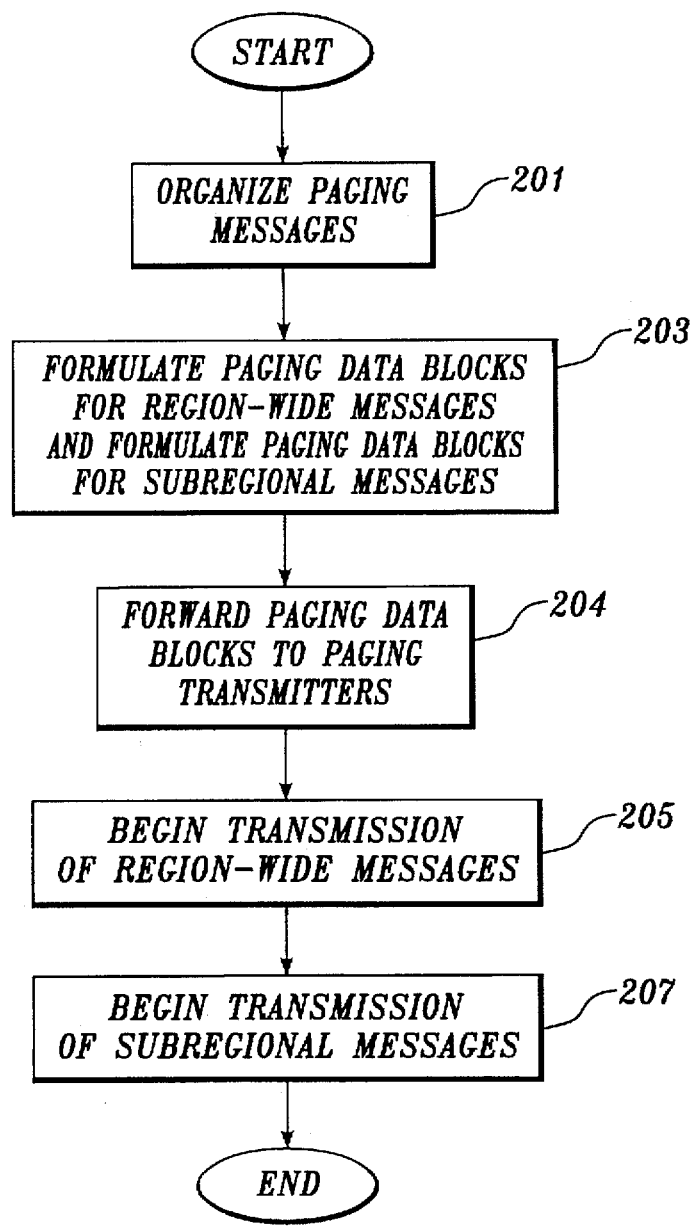
FIG. 3 is a flow diagram illustrating one embodiment of the method of the present invention.

Turning to FIG. 3, a description of the method of the present invention begins at a box 201 where the paging terminal 113 organizes the paging messages to be broadcast. In organizing the paging messages, the paging terminal 113 may use the "CAP code" to distinguish the messages intended for subscribers entitled to region-wide coverage from the messages intended for subscribers entitled to subregional coverage. A paging system operator may elect to use the organizing step to rearrange the messages, providing perhaps for more efficient operation of the paging system.

Moving on to box 203, the paging terminal then formulates one or more paging data blocks containing the paging messages to be broadcast. These paging data blocks may include paging messages intended for region-wide broadcast as well as paging messages intended for broadcast only within the various defined subregions. In particular, the paging terminal 113 first formulates a paging data block that is for region wide paging messages. These are paging messages that are to be broadcast by all of the paging transmitters 115. In addition, in accordance with prior art techniques, as exemplified by U.S. Pat. Nos. 5,365,569, 5,369,682, and 5,416,808, all to Witsaman et al. and commonly assigned to the assignee of the present invention, the paging data block is assigned a specific time (referred to as Assigned Time 1) at which all paging transmitters 115 are to transmit the paging messages contained therein.

Additionally, still at box 203, the paging terminal 113 formulates the paging data block for the subregional messages. Like the paging data block for the region-wide messages, the paging data block includes a specific time (referred to as Assigned Time 2) at which the paging transmitters are to broadcast their respective subregional paging messages. As will be seen in greater detail below, the paging data blocks also include a header portion that identifies which paging messages are to be transmitted by which particular paging transmitters at Assigned Time 2.

As illustrated by box 204, the paging terminal 113 next forwards the paging data blocks to the paging transmitters 115. Paging message data blocks are forwarded to all 119 of the paging transmitters 115. In the preferred embodiment of this invention, each paging transmitter then analyzes the paging messages and determines which paging messages are active, i.e. intended to be broadcast from that particular transmitter. Such analysis and determination is often accomplished through inspection of the header of the paging data block. The header of the paging data block includes information that identifies which paging messages are to be broadcast by which paging transmitters 115.

For example, recall that all 119 of the paging transmitters 115, acting in concert, operate to broadcast region-wide paging messages to the entire primary geographic region 101. In addition, recall that paging transmitters belonging to subset 123 of the plurality of paging transmitters 115 also broadcast to the Seattle subregion 107. Paging transmitters belonging to subset 123 will analyze the paging data blocks for paging messages intended to be broadcast within the Seattle subregion 107. These messages include region-wide messages as well as subregional messages intended for the Seattle subregion 107. The paging transmitters that belong to subset 123 will ignore the paging messages designated for broadcast to other subregions. Ignored paging messages are eventually discarded. Paging transmitters that do not cover any designated subregion and therefore do not belong to any subregional subset of paging transmitters, will broadcast only region-wide messages; these transmitters will remain silent during subregional broadcast time.

Furthermore, the paging data blocks containing the paging messages typically include a time to begin transmission of the paging messages. Because each of the paging transmitters 115 has a very accurate clock contained therein, each of the paging transmitters 115 will broadcast the paging messages at a precise, correct time. The description of the paging transmitters along with the paging terminal and a general description of the paging system is provided in the patents noted above commonly assigned to the assignee of the present invention and will not be repeated herein. It is sufficient to note that providing a time to begin transmission enables paging transmitters to simultaneously broadcast, or simulcast, the paging messages. Thus, during a region-wide simulcast mode of operation, all 119 of the paging transmitters 115 simultaneously broadcast paging messages intended for region-wide broadcast. During subregional simulcast mode of operation, paging transmitters that belong to subsets 121, 123, and 125, for example, that cover a specified subregion, simultaneously broadcast subregional paging messages to their respective subregion.

The steps for broadcasting the paging messages, according to the method of the present invention, are described by box 205 and box 207. At box 205, the paging system enters a region-wide simulcast mode of operation wherein each of the paging transmitters 115 begins transmission of region-wide paging messages that have been delivered from the paging terminal 113. The transmission of the paging messages is in accordance with techniques known in the paging art.

Next, at box 207, the paging system enters a subregional simulcast mode of operation wherein each of the paging transmitters that belong to particular subregional subsets (as noted, for example, by reference numerals 121, 123, and 125) simultaneously transmit messages designated for their respective subregion. Note that certain of the paging transmitters 115 may not belong to any of the subregional subsets and therefore will not be transmitting at this time. In contrast to the subregional paging of the prior art where all paging transmitters outside a subregion would remain silent while each subregion takes its turn broadcasting, the present invention discloses a method whereby all of the subregional broadcasts occur at substantially the same time. The only paging transmitters intentionally switched off are those not belonging to any subregional subset. The amount of silence, or downtime, experienced by the paging systems of the prior art is minimized by the method of the present invention. In this manner, the paging system's capacity to handle larger numbers of customers is improved.

While one embodiment of the method of the present invention has been illustrated and described above, it is appreciated that various changes may be made therein without departing from the spirit and scope of the invention. For instance, the steps illustrated by boxes 201 and 203 in FIG. 3 may be combined into a single step whereby the paging terminal 113 may organize paging messages and formulate paging data blocks as each paging message enters the paging system. The paging transmitters may also analyze and distinguish region-wide paging messages from subregional paging messages before or during the region-wide 205 and subregional 207 broadcast periods.

It may also prove prudent for the paging system operator to permit the paging terminal 113 to analyze and distinguish the region-wide paging messages from the subregional paging messages and arrange the paging message data blocks accordingly before the messages are forwarded to the paging transmitters 115. The step of forwarding the paging message data blocks, as indicated by box 204, may be split up whereby paging data blocks with region-wide messages may be forwarded to the paging transmitters as paging data blocks with subregional messages are being formulated. Indeed, depending upon the configuration of the paging system, subregional paging data blocks may be forwarded to the paging transmitters while region-wide transmission is in progress. Similarly, region-wide paging data blocks may be forwarded to the paging transmitters while the paging transmitters are engaged in the subregional transmission mode.

Figure 4:
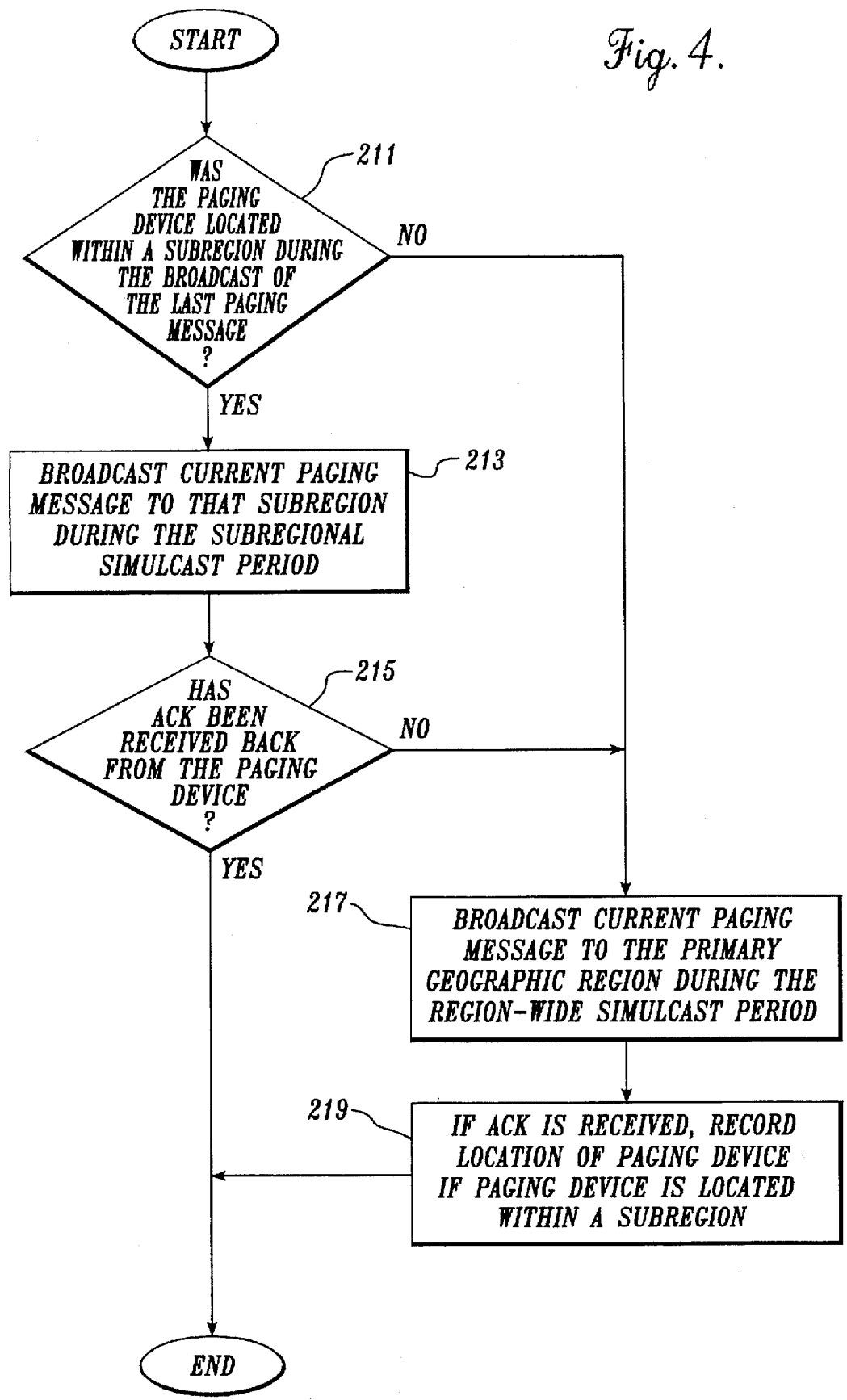
FIG. 4 is a flow diagram illustrating another embodiment of the method of the present invention suited for use with two-way paging systems.
Figure 5:
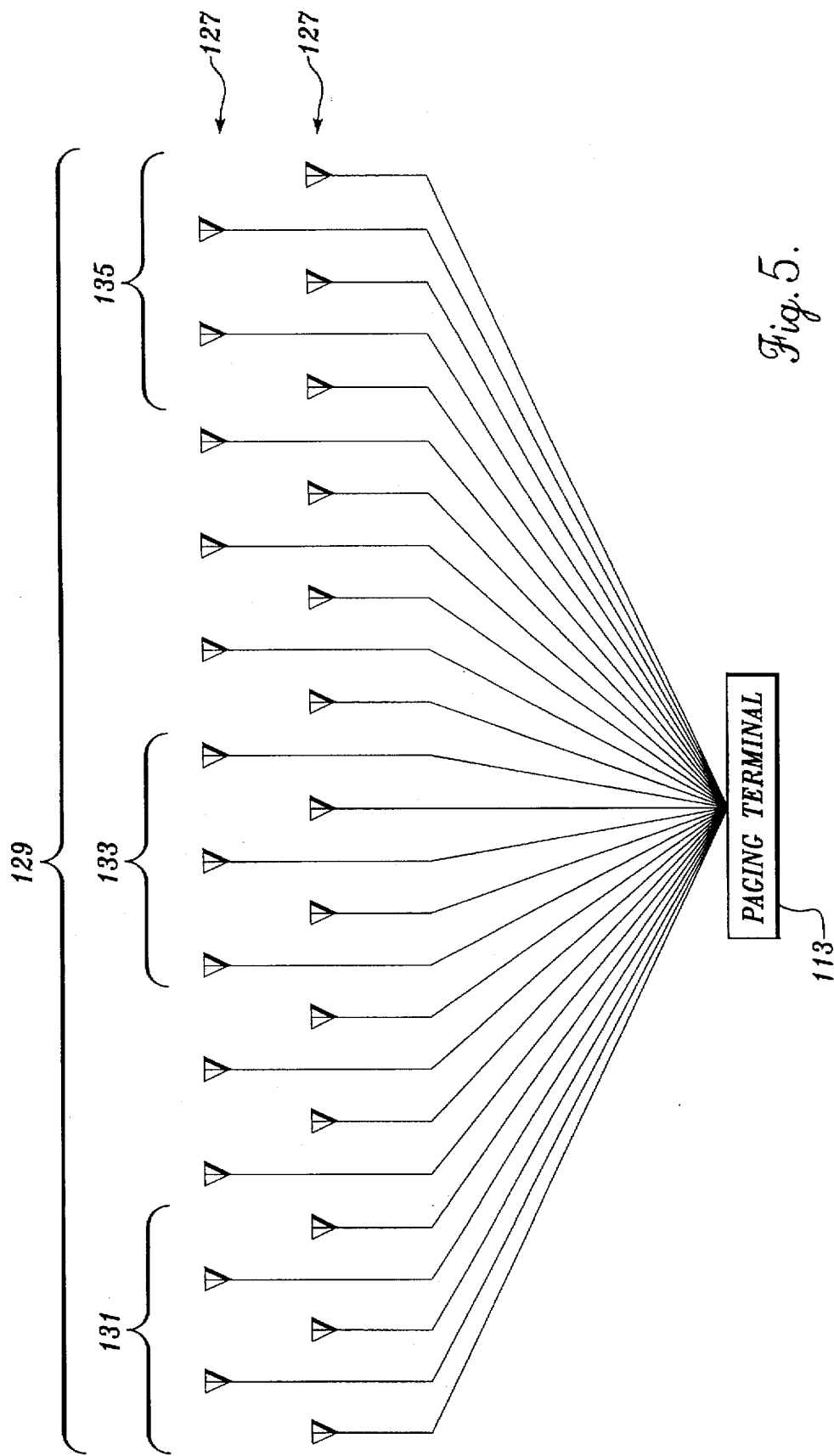
FIG. 5 is a schematic illustration of a paging system receiver network configured in accordance with the present invention.

Referring now to FIGS. 4 through 6, the method of the present invention is further adaptable to use capabilities present in two-way paging systems. In a two-way paging system, paging devices used by subscribers to receive paging messages are further configured to transmit signals as well. The paging system has a network of receivers for receiving signals transmitted from paging devices. Such a receiver network is illustrated schematically in FIG. 5. Receivers 127 are spaced throughout the primary geographic region 101 (see FIG. 1) such that signals sent from paging devices located within the region 101 are received. The receivers 127 forward information received from the paging devices to the paging terminal 113. The lines connecting the receivers 127 and the paging terminal 113 do not necessarily indicate a physical connection. Receivers 127 may communicate with the paging terminal 113 through any type of transmission means.

It is appreciated that the receiver network may be constructed separately from the plurality of paging transmitters 115 as shown in FIG. 2. The receivers, however, should cover substantially the same area as covered by the plurality of paging transmitters. As with the paging transmitters 115, receivers 127 which cover designated subregions may be grouped into subregional subsets. For illustrative purposes, subregional subsets of receivers indicated by reference numerals 131, 133, and 135 may correspond with the subregional subsets of paging transmitters 121, 123, and 125 (see FIG. 2). Thus, for example, subregional subset 131 receives signals from paging devices located within the coverage area of the Portland subregion 103, as illustrated in FIG. 1. Similarly, subregional subsets 133 and 135 receive signals from paging devices located within the coverage area of the Seattle subregion 107 and Vancouver subregion 109, respectively.

A two-way paging system configured in this manner permits a paging terminal 113 to determine the approximate location of a subscriber's paging device. Typically, when a paging device in a two-way paging system receives a paging message, it transmits back to the paging system an "acknowledgment" signal. Such a signal is herein referred to as ACK. The receivers 127 of the paging system are configured to receive the signal ACK. Furthermore, the receivers 127 typically inform the paging terminal 113 that ACK has been received. When one of the receivers 127 receives a signal, such as ACK, from a paging device, the paging terminal 113 is able to determine the location and range of coverage of the receiver. That information allows the paging terminal to further determine the approximate location of the paging device. As illustrated below, knowledge that a paging device is located within the coverage of a subregional subset of paging transmitters allows a paging system to reroute a paging message intended for region-wide broadcast to be broadcast only to the identified subregion during subregional broadcast time.

The method of the present invention is adaptable for use with a two-way paging system as described in the flow diagram of FIG. 4. Both FIG. 4 and FIG. 6 describe embodiments of the presently disclosed method whereby paging messages intended for region-wide broadcast may be broadcast instead to only one or more subregions during subregional broadcast time. A flexible paging system that can reroute region-wide paging messages to be broadcast subregionally can balance the broadcast traffic more evenly, thereby increasing the capacity of the paging system for handling larger numbers of subscribers.

In accordance with the method of the present invention, the paging system first identifies the recipient of a paging message intended for region-wide broadcast. Then, beginning in box 211 of FIG. 4, the paging terminal 113 of the two-way paging system determines whether the paging device of the intended recipient was located within the coverage area of a subregion during the transmission of the last paging message broadcast to that recipient. As previously discussed, when a paging device in a two-way paging system receives a paging message, the paging device transmits an acknowledgment signal receivable by the paging system. At this time, the paging system may determine and record of the approximate location of the paging device, thereby providing a record of where the paging device was last located. As indicated by box 211, when a region-wide paging message for a paging device is prepared for broadcast, the paging terminal 113 determines whether the paging device was last located within the coverage area of a subregion. If the paging device was located within the coverage of a particular subregion, the paging terminal 113 then reroutes the paging message originally intended for region-wide broadcast to that subregion for subregional broadcast, as indicated by box 213. When the paging system enters the subregional simulcast mode of operation, as provided by the method of the present invention, the region-wide paging message is broadcast only to the identified subregion. The paging system then determines whether the paging message was successfully received by intended paging device. As indicated by box 215, this determination may be accomplished by waiting to see if the paging device responds with an acknowledgment (ACK) signal. The receipt of an ACK signal from the paging device signifies that the paging message was successfully received by the paging device. If an ACK signal is not received, then it is presumed that the paging device did not successfully receive the paging message. Such result may arise if the paging device was transported to an area outside the coverage of the subregion in which the paging message had been broadcast. If an ACK signal is not received, the paging terminal 113 designates the paging message to be rebroadcast region-wide during the region-wide simulcast mode of operation, as indicated by box 217. In addition, a region-wide paging message may be broadcast during the region-wide simulcast period if the paging terminal 113 does not determine that the recipient paging device was last located within a subregional coverage area (see box 211). After the paging message has been broadcast region-wide and an ACK signal has been received by the paging system, the paging terminal 113 may determine and record of the approximate location of the paging device for future reference, as shown by box 219.

It is appreciated that the method, as discussed above, may be altered without departing from the scope of the present invention. For instance, the paging terminal may determine the approximate location of the paging device when the process begins, as given by box 211, or when the process is complete, as given by box 219. In addition, the recordation of the location of the paging device includes a recordation of any information which may be used to calculate the approximate location of the paging device. The location of the paging device may be determined from any signal transmitted from the paging device, including an ACK signal, as previously discussed.

The method of selectively simulcasting paging messages in designated subregions, at substantially the same time, may also be accomplished by the procedure outlined in flow diagram form in FIG. 6. In this embodiment, the method again first identifies the recipient of a region-wide paging message. Then, beginning at box 221, the paging system broadcasts a "request acknowledgment (ACK)" message to the paging device during region-wide simulcast. When the paging device responds with an ACK signal, the paging terminal 113 determines which subregion, if any, wherein the paging device in located, as indicated by box 223. Progressing to box 225, the paging terminal 113 determines whether the paging device is currently located within the coverage of a subregion. If the paging device is located within a subregion, the region-wide message is redesignated to be broadcast to the respective subregion during the subregional simulcast time, as shown in box 227. If the paging device proves to be located outside the coverage of any of the subregions, the paging terminal 113 allows the paging message to continue to be broadcast to the entire region during the region-wide simulcast time, as indicated by box 229.

Polling the paging device of the intended recipient, as is done in box 221, may be accomplished in any number of ways. It is appreciated by those skilled in the art that petitioning the paging device for any sort of signal, including an ACK signal as identified above, is contemplated by the method of the present invention. In addition, the steps in box 223 and box 225 be performed separately, as discussed, or in a combined manner. These modifications and others may be made without departing from the spirit and scope of the method of the present invention.

The embodiments of the invention in which an exclusive property or privilege is claimed are defined as follows:

1. A method of transmitting paging messages over a paging system, the paging system providing coverage to a primary geographic region and at least two subregions within the primary geographic region, the paging messages including region-wide paging messages intended for broadcast to said primary geographic region and subregional paging messages intended for broadcast to any of said at least two subregions, the paging system including a plurality of paging transmitters for broadcasting paging messages and at least two subregional subsets of the plurality of paging transmitters, each of said at least two subregional subsets providing coverage to a corresponding one of said at least two subregions, the method comprising the steps of:
(1) transmitting the region-wide paging messages through the plurality of paging transmitters through said at least two subregional subsets of the plurality of paging transmitters at a first predetermined time and for a first predetermined period of time; and
(2) transmitting the subregional paging messages at a second predetermined time and for a second predetermined period of time, the broadcast in each of said at least two subregions occurring substantially simultaneously, each of said at least two subregions being covered by transmission from the corresponding one of said at least two subregional subsets of the plurality of paging transmitters.

2. The method of claim 1, further comprising the steps of formulating a region-wide paging data block prior to broadcast by:
(1) distinguishing said region-wide paging messages intended for broadcast to the primary geographic region from said subregional paging messages intended for broadcast to a respective subregion, and
(2) providing a group identity to the region-wide paging messages.

3. The method of claim 1, further comprising the steps of formulating a subregional paging data block prior to broadcast by:
(1) distinguishing said region-wide paging messages intended for broadcast to the primary geographic region from said subregional paging messages intended for broadcast to a respective subregion, and
(2) providing a group identity to the subregional paging messages.

4. The method of claim 1, further comprising the steps of formulating a combined paging data block prior to broadcast by:
(1) distinguishing said region-wide paging messages intended for broadcast to the primary geographic region from said subregional paging messages intended for broadcast to a respective subregion,
(2) providing a first group identity to the region-wide paging messages,
(3) providing a second group identity to the subregional paging messages, and
(4) providing a combined group identity to the first group identified region-wide paging messages and the second group identified subregional paging messages.

5. The method of claim 2, further comprising the step of forwarding the region-wide paging data block to the plurality of paging transmitters.

6. The method of claim 3, further comprising the step of forwarding the subregional paging data block to the respective subregional subset of the plurality of paging transmitters.

7. The method of claim 4, further comprising the step of forwarding to the plurality of paging transmitters the combined paging data block corresponding to the subregional subset of the plurality of paging transmitters to which the respective paging transmitter belongs.

8. A method of transmitting paging messages over a two-way paging system, the two-way paging system providing coverage to a primary geographic region and at least two subregions within the primary geographic region, the paging messages including region-wide paging messages intended for broadcast to said primary geographic region and subregional paging messages intended for broadcast to said at least two subregions, the two-way paging system including a plurality of paging transmitters for broadcasting paging messages, a plurality of paging devices for receiving and transmitting messages, a plurality of receivers for receiving transmissions from paging devices, and at least two subregional subsets of the plurality of paging transmitters, each of said at least two subregional subsets providing coverage to a corresponding one of said at least two subregions, the method comprising the steps of:
(1) transmitting the region-wide paging messages through the plurality of paging transmitters at a first predetermined time and for a first predetermined period of time; and
(2) transmitting the subregional paging messages through said at least two subregional subsets of the plurality of paging transmitters at a second predetermined time and for a second predetermined period of time, the broadcast in each of said at least two subregions occurring substantially simultaneously, each of said at least two subregions being covered by transmission from the corresponding one of said at least two subregional subsets of the plurality of paging transmitters.

9. The method of claim 8, further comprising the steps of formulating a region-wide paging data block prior to broadcast by:
(1) distinguishing said region-wide paging messages intended for broadcast to the primary geographic region from said subregional paging messages intended for broadcast to a respective subregion, and
(2) providing a group identity to the region-wide paging messages.

10. The method of claim 8, further comprising the steps of formulating a subregional paging data block prior to broadcast by:
(1) distinguishing said region-wide paging messages intended for broadcast to the primary geographic region from said subregional paging messages intended for broadcast to a respective subregion, and
(2) providing a group identity to the subregional paging messages.

11. The method of claim 8, further comprising the steps of formulating a combined paging data block prior to broadcast by:
(1) distinguishing said region-wide paging messages intended for broadcast to the primary geographic region from said subregional paging messages intended for broadcast to a respective subregion,
(2) providing a first group identity to the region-wide paging messages,
(3) providing a second group identity to the subregional paging messages, and
(4) providing a combined group identity to the first group identified region-wide paging messages and the second group identified subregional paging messages.

12. The method of claim 9, further comprising the step of forwarding the region-wide paging data block to the plurality of paging transmitters.

13. The method of claim 10, further comprising the step of forwarding the subregional paging data block to the respective subregional subset of the plurality of paging transmitters.

14. The method of claim 11, further comprising the step of forwarding to the plurality of paging transmitters the combined paging data block corresponding to the subregional subset of the plurality of paging transmitters to which the respective paging transmitter belongs.

15. A method of transmitting paging messages over a two-way paging system, the two-way paging system providing coverage to a primary geographic region and at least two subregions within the primary geographic region, the paging messages including region-wide paging messages intended for broadcast to said primary geographic region and subregional paging messages intended for broadcast to said at least two subregions, the two-way paging system including a plurality of paging transmitters for broadcasting paging messages, a plurality of paging devices for receiving and transmitting messages, a plurality of receivers for receiving transmissions from paging devices, and at least two subregional subsets of the plurality of paging transmitters, each of said at least two subregional subsets providing coverage to a corresponding one of said at least two subregions, the method comprising the steps of:
- (a) transmitting the region-wide paging messages through the plurality of paging transmitters at a first predetermined time and for a first predetermined period of time; and
- (b) transmitting the subregional paging messages through said at least two subregional subsets of the plurality of paging transmitters at a second predetermined time and for a second predetermined period of time, the broadcast in each of said at least two subregions occurring substantially simultaneously, each of said at least two subregions being covered by transmission from the corresponding one of said at least two subregional subsets of the plurality of paging transmitters;

the method further comprising the steps of providing for transmission of at least one region-wide paging message to a subregion during the subregional broadcast period by:

(1) determining if the region-wide paging message is directed to a paging device that was located within a subregion covered by the transmission coverage of a subregional subset of the plurality of paging transmitters;

(2) if said determination of paging device location indicates that the paging device was located within a subregion covered by the transmission coverage of a subregional subset of the plurality of paging transmitters, then
- (a) causing the region-wide paging message to be broadcast to the subregion covered by the respective subregional subset of the plurality of paging transmitters during the subregional broadcast period;
- (b) after the subregional broadcast of the region-wide paging message is complete, firstly determining if the plurality of receivers has received an acknowledgment signal from the paging device; and
- (c) if said first determination of acknowledgment signal indicates that an acknowledgment signal has not been received, then
  - (i) causing the region-wide paging message to be broadcast to the primary geographic region during the region-wide broadcast period;
  - (ii) after the region-wide broadcast of the region-wide paging message, secondly determining if the plurality of receivers has received an acknowledgment signal from the paging device; and
  - (iii) if said second determination of acknowledgment signal indicates that an acknowledgment signal has been received, then causing a recordation of the location of the paging device;

(3) otherwise, if said determination of paging device location indicates that the paging device was not located within a subregion covered by the transmission coverage of a subregional subset of the plurality of paging transmitters, then
- (a) causing the region-wide paging message to be broadcast to the primary geographic region during the region-wide broadcast period;
- (b) after the region-wide broadcast of the paging message, determining if the plurality of receivers has received an acknowledgment signal from the paging device; and
- (c) if said determination of acknowledgment signal indicates that an acknowledgment signal has been received, then causing a recordation of the location of the paging device.

16. A method of transmitting paging messages over a two-way paging system, the two-way paging system providing coverage to a primary geographic region and at least two subregions within the primary geographic region, the paging messages including region-wide paging messages intended for broadcast to said primary geographic region and subregional paging messages intended for broadcast to said at least two subregions, the two-way paging system including a plurality of paging transmitters for broadcasting paging messages, a plurality of paging devices for receiving and transmitting messages, a plurality of receivers for receiving transmissions from paging devices, and at least two subregional subsets of the plurality of paging transmitters, each of said at least two subregional subsets providing coverage to a corresponding one of said at least two subregions, the method comprising the steps of:
- (a) transmitting the region-wide paging messages through the plurality of paging transmitters at a first predetermined time and for a first predetermined period of time; and
- (b) transmitting the subregional paging messages through said at least two subregional subsets of the plurality of paging transmitters at a second predetermined time and for a second predetermined period of time, the broadcast in each of said at least two subregions occurring substantially simultaneously, each of said at least two subregions being covered by transmission from the corresponding one of said at least two subregional subsets of the plurality of paging transmitters:

the method further comprising the steps of providing for broadcast of at least one region-wide paging message to a subregion during the subregional broadcast period by:

(1) identifying the paging device to which the region-wide paging message is directed;

(2) requesting the paging device to broadcast an acknowledgment signal;

(3) determining if the plurality of receivers has received an acknowledgment signal from the paging device; and (4) if said determination of acknowledgment signal indicates that an acknowledgment signal has been received, then
   (a) determining if the paging device is located within a subregion covered by the transmission coverage of a subregional subset of the plurality of paging transmitters;
   (b) if said determination of paging device location indicates that the paging device is located within a subregion covered by the transmission coverage of a subregional subset of the plurality of paging transmitters, then broadcasting the region-wide paging message to the subregion during the subregional broadcast period;
   (c) otherwise, if said determination of paging device location indicates that the paging device is not located within a subregion covered by the transmission coverage of a subregional subset of the plurality of paging transmitters, then broadcasting the region-wide paging message to the primary geographic region during the region-wide broadcast period.

* * * * *

UNITED STATES PATENT AND TRADEMARK OFFICE
CERTIFICATE OF CORRECTION

PATENT NO. : 5,732,357
DATED : March 24, 1998
INVENTOR(S) : D.W. Gayton et al.

It is certified that error appears in the above-identified patent and that said Letters Patent is hereby corrected as shown below:

| COLUMN | LINE | |
|---|---|---|
| 11 (Claim 1, | 14-16 lines 16-18) | After "paging transmitters" delete "through said at least two subregional subsets of the plurality of paging transmitters" |
| 11 (Claim 1, | 18 line 20) | Before "at a second" insert --through said at least two subregional subsets of the plurality of paging transmitters-- |
| 14 (Claim 16, | 58 line 31) | After "transmitters" delete ":" and insert therefor --;-- |

Signed and Sealed this

Thirtieth Day of June, 1998

Attest:

BRUCE LEHMAN

*Attesting Officer*  *Commissioner of Patents and Trademarks*